United States Patent
Raley et al.

(10) Patent No.: US 7,677,584 B2
(45) Date of Patent: Mar. 16, 2010

(54) MOTORIZED COLLAPSIBLE STEP

(75) Inventors: Richard W. Raley, Cottage Grove, OR (US); Brock E. Ferguson, Cottage Grove, OR (US); Ronald R. Jellison, Creswell, OR (US)

(73) Assignee: Actuant Corporation, Butler, WI (US)

( * ) Notice: Subject to any disclaimer, the term of this patent is extended or adjusted under 35 U.S.C. 154(b) by 115 days.

(21) Appl. No.: 11/869,853

(22) Filed: Oct. 10, 2007
(Under 37 CFR 1.47)

(65) Prior Publication Data

US 2008/0157500 A1    Jul. 3, 2008

Related U.S. Application Data

(60) Provisional application No. 60/828,876, filed on Oct. 10, 2006.

(51) Int. Cl.
*B60R 3/02* (2006.01)
(52) U.S. Cl. .................. 280/166; 280/163; 182/88; 182/127
(58) Field of Classification Search .................. 280/163, 280/164.1, 166; 182/88, 127
See application file for complete search history.

(56) References Cited

U.S. PATENT DOCUMENTS

| | | | |
|---|---|---|---|
| 4,110,673 A | 8/1978 | Magy et al. | |
| 5,085,450 A * | 2/1992 | DeHart, Sr. | 280/166 |
| 5,505,476 A | 4/1996 | Maccabee | |
| 5,547,040 A | 8/1996 | Hanser et al. | |
| 5,842,709 A | 12/1998 | Maccabee | |
| 5,957,237 A | 9/1999 | Tigner | |
| 6,082,751 A | 7/2000 | Hanes et al. | |
| 6,213,486 B1 | 4/2001 | Kunz et al. | |
| 6,655,706 B1 | 12/2003 | Murrell | |
| 6,659,224 B2 * | 12/2003 | Medsker | 182/91 |
| 6,942,233 B2 | 9/2005 | Leitner | |
| 7,377,531 B2 * | 5/2008 | Fabiano et al. | 280/163 |
| 7,413,204 B2 * | 8/2008 | Leitner | 280/163 |
| 7,513,520 B2 * | 4/2009 | Okuyama | 280/166 |

* cited by examiner

*Primary Examiner*—Paul N Dickson
*Assistant Examiner*—John D Walters
(74) *Attorney, Agent, or Firm*—Quarles & Brady LLP

(57) ABSTRACT

The present invention provides an improved collapsible step assembly for recreational vehicles. The movable step apparatus comprises a mounting frame, at least one step mounted to the frame through a linkage assembly, and a pivot assembly having a pivot rod with a longitudinal axis of rotation. In use, the pivot rod is rotatably mounted to the frame and rotates the linkage assembly and the steps between an extended position and a retracted position. Rotating the pivot rod in a first direction moves the step to the extended position, and rotating the pivot rod in the opposite direction moves the step to the retracted position. A two-part linkage is rotatably engaged between the pivot rod and the step linkage and transfers downward forces on the step when retracted and when extended to the drive unit so that the step stays in its position.

15 Claims, 7 Drawing Sheets

MOTORIZED COLLAPSIBLE STEP

CROSS-REFERENCE TO RELATED APPLICATIONS

This claims the benefit of U.S. Provisional Patent Application No. 60/828,876 filed Oct. 10, 2006.

STATEMENT REGARDING FEDERALLY SPONSORED RESEARCH OR DEVELOPMENT

Not applicable.

FIELD OF THE INVENTION

The invention relates generally to movable step assemblies for recreational vehicles and in particular to an apparatus for extending and retracting a movable step assembly.

BACKGROUND

Automatic step systems for recreational vehicles, motor homes, and the like are well known in the art. These systems are typically electrically-controlled and electrically-actuated to extend and retract an entryway step in response to a signal provided by an individual wishing to enter or exit the vehicle. One common system extends the step when the vehicle door is opened, and then retracts the step when the vehicle door is closed. Other systems offer a switch located just inside the vehicle door which controls the extension and retraction of the step. These systems also include a master power switch which can be used to lock the step in a given position.

Alternative systems incorporate a motor assembly for automatically-extending and retracting the step assembly. The motor rotates a pivot rod through a gear assembly which is coupled to the rod. The pivot rod moves a linkage assembly to extend and retract the steps. However, these systems often fail over time, giving the step a "spongy" or unstable feel. Therefore, an improved mechanism for extending and retracting collapsible steps in recreational vehicles is needed.

BRIEF DESCRIPTION OF THE INVENTION

The present invention provides an improved collapsible step assembly for recreational vehicles. In one aspect, the invention provides a movable step apparatus including a mounting frame, at least one step mounted to the frame through a linkage assembly and a pivot member having a longitudinal axis of rotation.

In use, the pivot member is rotatably mounted to the frame and rotates the linkage assembly and the at least one step between an extended position and a retracted position. Rotating the pivot member in a first direction moves the step to the extended position, and rotating the pivot member in an opposite direction moves the step to the retracted position. In a preferred version the pivot member is a rod.

Opposing ends of the pivot member are attached to a two-part linkage, each linkage mounted directly to the frame. The two-part linkage comprises a first link or crank mounted to rotate with the rod and pivotally attached to a second link. When the at least one step is in the extended position, the crank is substantially aligned and parallel with the straight link. In use, when the at least one step is in the extended position, the crank rotates around the pivot member, and engages against the frame to stop in a position in which the crank is nearly aligned with the link thereby preventing excessive forces from being transferred to the drive or transmission system when weight is placed on the step.

The linkage assembly comprises a plurality of linkages pivotally connecting the frame to the at least one step.

In a second aspect, the invention provides a movable step apparatus comprising a mounting frame, a motor mounted to the frame, at least one step, a pivot member mounted to the frame, a linkage assembly and a transmission assembly. The pivot member rotates about its longitudinal axis of rotation and moves the linkage assembly connecting the at least one step, the frame and the pivot member to the transmission assembly. The transmission assembly moves the pivot member (preferably a rod), which moves the at least one step between an extended position and a retracted position.

The linkage assembly may comprise a first linkage pivotally connecting the frame to a first at least one step, a second linkage pivotally connecting the frame to a second at least one step, and a third linkage pivotally connecting the first and second steps together.

In a third aspect, the invention also provides a mounting frame and a motor drive unit. The motor, mounted to the frame, has an output shaft, and is engaged to a drive gear through the motor's output gear, which is preferably a worm gear drive train. The drive gear is rotatable about an axis of rotation. In use, rotating the motor output gear, which may be rotated by a worm gear on the motor shaft, rotates the drive gear, which in turn rotates the pivot rod through a link arm to move the at least one step into an extended position. When in the extended position, the crank is pivoted around the pivot rod, engaging against the frame in a stopped position in which the crank is nearly aligned with the link of the two-part linkage system.

By utilizing the two-part linkage system on opposing ends of the pivot rod, the motor is nearly isolated from the forces exerted on the steps. This configuration improves the durability and longevity of motors for collapsible step assemblies while reducing servicing requirements, while also preventing the "spongy" or unstable feel conventional step assemblies can develop over time and avoiding "popping" type impacts that can occur if the step changes direction while being driven.

DETAILED DESCRIPTION OF THE INVENTION

The invention comprises a collapsible step assembly 10 for use with recreational vehicles. Referring to FIGS. 1-4, the assembly 10 comprises a generally rectangular and planar upper step 12, a lower step 14 and a frame 16. The steps 12, 14 move between an extended position (FIGS. 1, 2 and 4) and a retracted position (FIG. 3), wherein the steps 12, 14 and frame 16 remain substantially parallel to one another at all times.

Each step 12, 14 may be covered with a non-skid material (not shown) to increase the friction of their respective surfaces. The lengths of the steps 12, 14 are approximately one-half of their respective widths.

Each step 12, 14 also has arms 18 (18A of step 12 and 18B of step 14) which extend in a rearward direction from their outer edges. Arms 18 are approximately equal in length to the steps 12, 14 and may be reinforced by pieces of angle bar sock welded to them as illustrated.

The frame 16 is generally box-like in shape and has open front, rear and bottom sides, and retains the steps 12, 14 when the assembly 10 is in the retracted position. The frame 16 may also includes a mounting assembly to a vehicle (not shown), or may be bolted, welded, or otherwise fixed to the vehicle.

Figure 1:
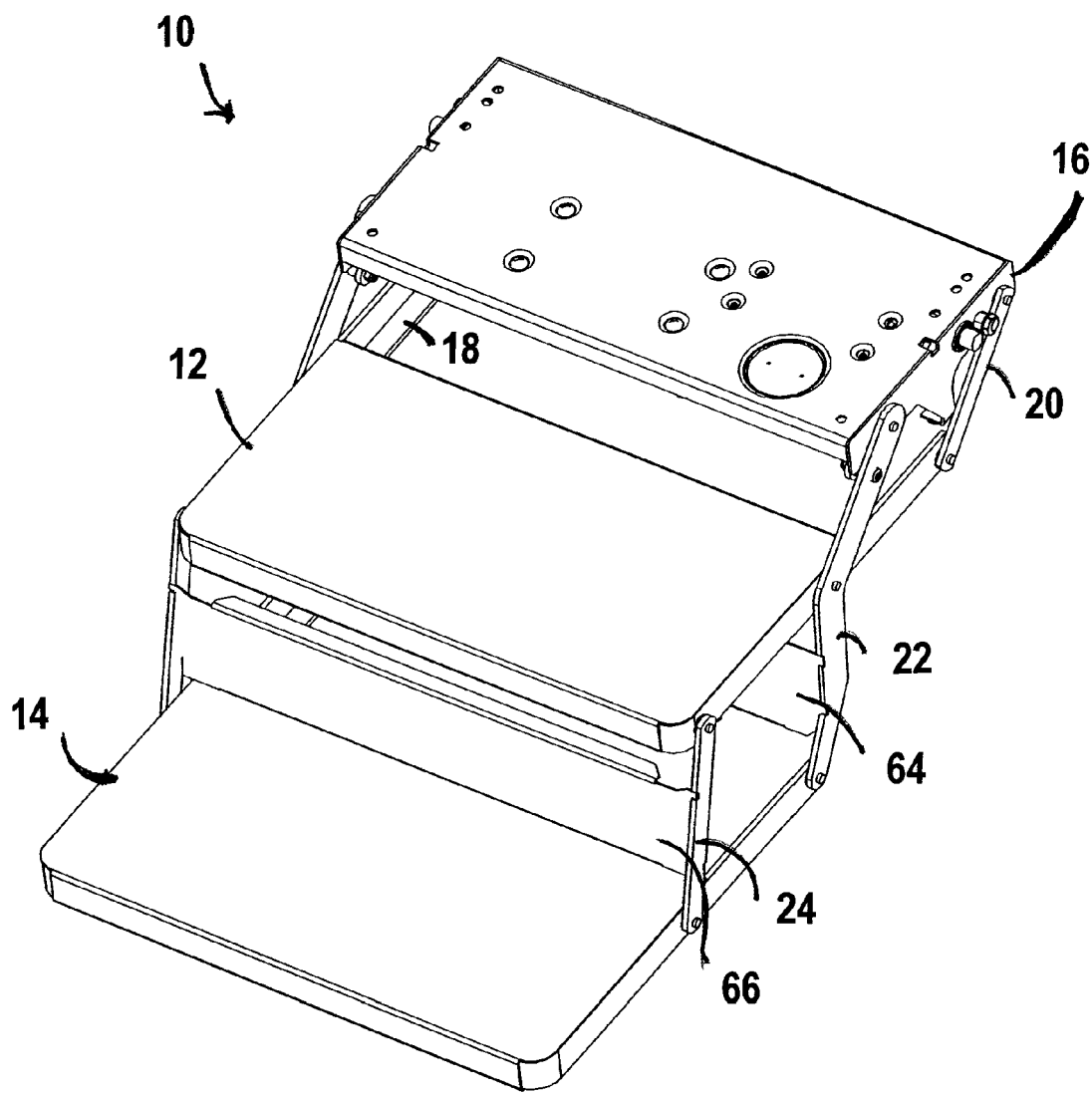
FIG. 1 is a front, top perspective view of a step assembly of the invention in the extended position.
Figure 2:
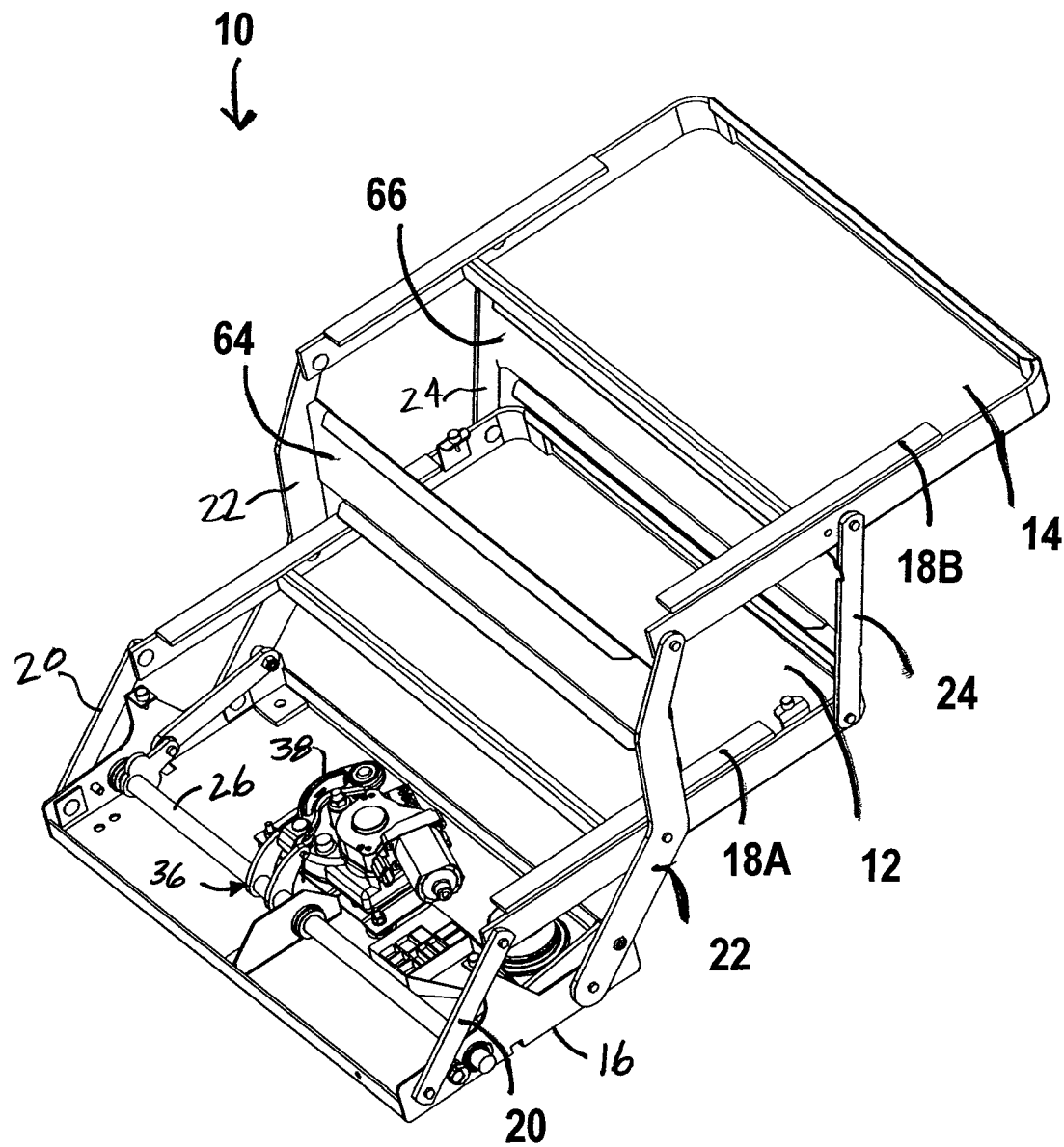
FIG. 2 is a rear, bottom perspective view of the assembly in the extended position.

The steps 12, 14 and the frame 16 are interconnected by a linkage assembly including three pivotable links; a rearward link 20, a medial link 22, and a forward link 24 (FIG. 2). The links 20, 22, 24 comprise straight, flat metal strips having two opposing lower and upper ends symmetrically arrayed along each side of the assembly 10. The links 20, 22, 24 pivot around each point of attachment between the extended and retracted positions. Rectangular support brackets 64, 66 secured to the respective medial and forward links 22,24 perpendicular to the steps 12, 14 help support the steps 12, 14 and reinforce the assembly during use.

The rearward link 20 connects the upper step 12 to the frame 16. The upper ends of each rearward link 20 are pivotally mounted near the upper rearward corners of the frame 16. The lower ends of each rearward link 20 are pivotally mounted near the rearward ends of the upper step arms 18A.

In use, when the assembly 10 is in the extended and retracted positions, the rearward links 20 are skewed downward towards the ground at approximately 45 degrees forward and rearward, respectively, relative to the frame 16.

The medial link 22 has a dogleg shape and pivotally connects the lower step 14 to the frame 16 and has its approximate midpoint pivotally connected to the upper step 12 near the point where the step 12 meets the upper step arm 18A. The medial link 22 is approximately twice as long as and slightly wider than the rearward link 20. The upper ends of the medial link 22 are pivotally mounted to the upper forward corners of the frame 16. The lower ends of the medial links 22 are pivotally mounted near the ends of the lower step arms 18A.

In use, when the assembly 10 is in the extended position, the medial links 22 are skewed forward and downward at approximately 65 degrees relative to the frame 16 and roughly straight down from step 12. In the retracted position, the medial links 22 are skewed rearward and downward at approximately 25 degrees relative to the frame 16.

The forward link 24 connects the lower step 14 to the upper step 12. The forward links 24 are slightly longer than the rearward links 20 and shorter than the medial links 22. The upper ends of the forward links 24 are pivotally mounted near the forward corners of the lower step 14. The lower ends of the forward links 24 are pivotally mounted to the lower step 14 near the point where the lower step arm 18B extends from the lower step 14.

In use, when the assembly 10 is in the extended position, the forward links 24 are skewed downward and slightly forward at approximately 80 degrees relative to the lower step 14. In the retracted position, the forward links 24 are skewed rearward and downward at approximately 15 degrees relative to the lower step 14.

Figure 5:
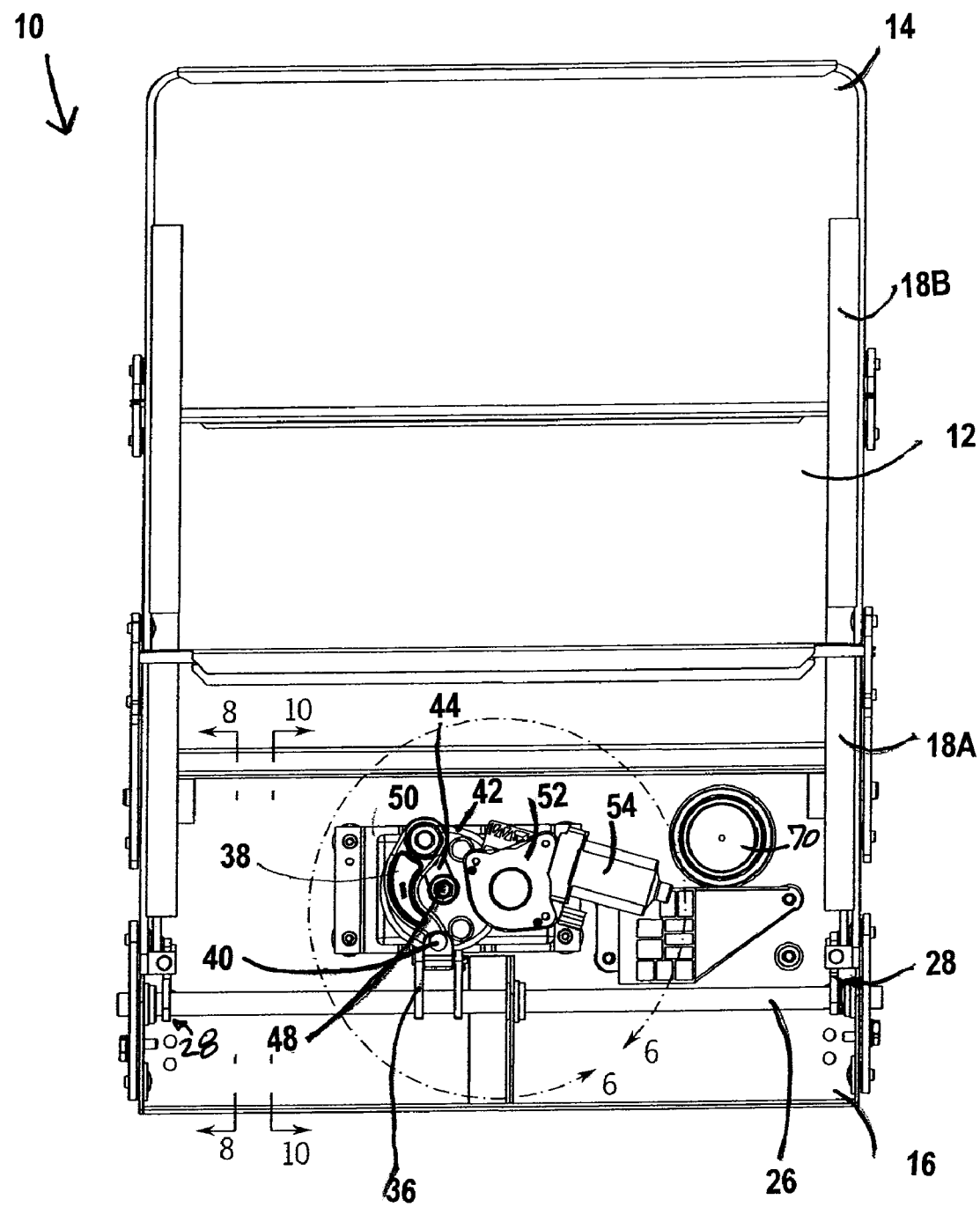
FIG. 5 is a bottom plan view of the assembly in the extended position.
Figure 6:
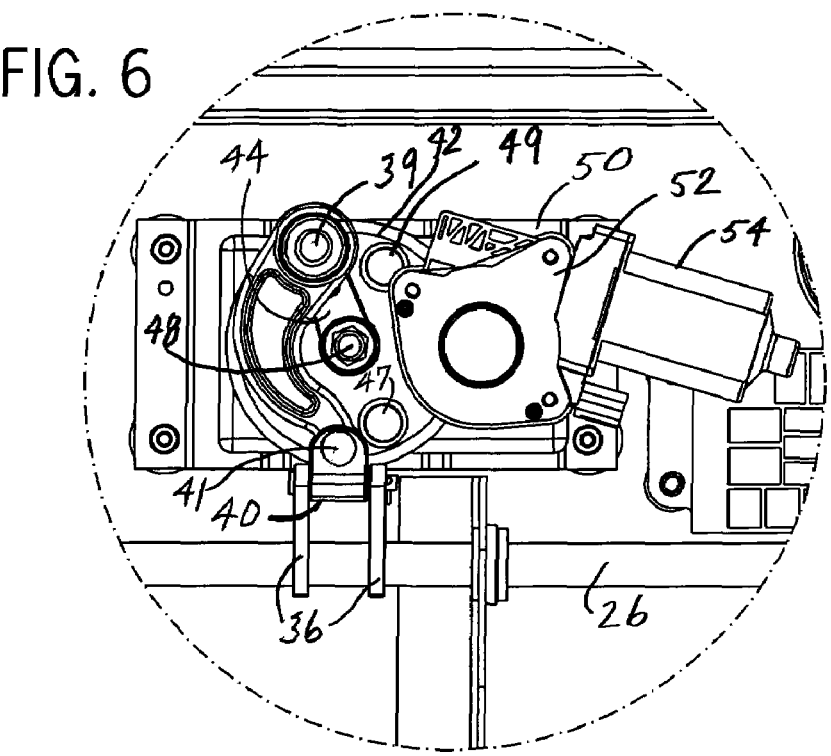
FIG. 6 is a detail view of the drive portion of the circumscribed by line assembly 6-6 of FIG. 5 in the extended position.
Figure 7:
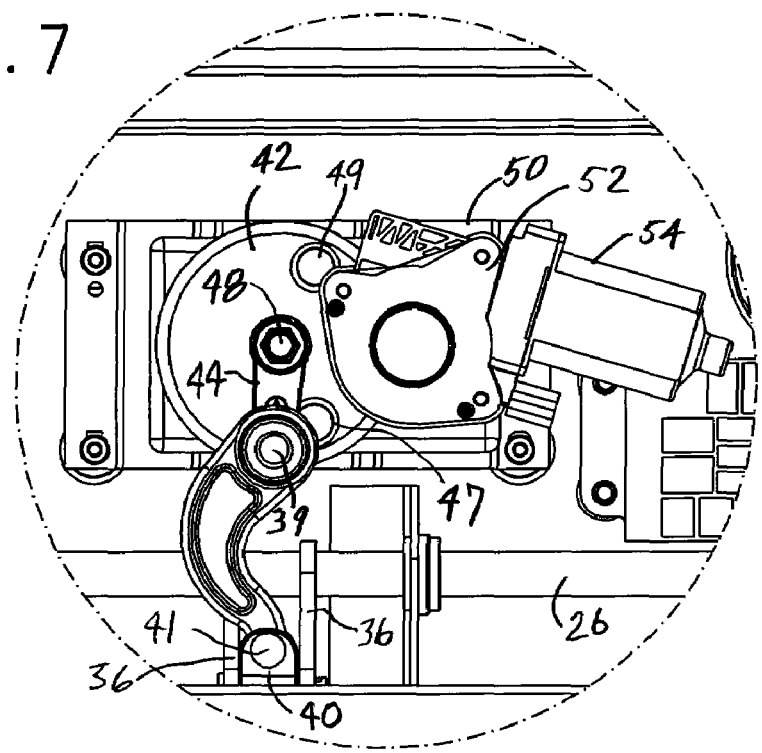
FIG. 7 is a top view of the assembly of FIG. 6 in the retracted position.
Figure 8:
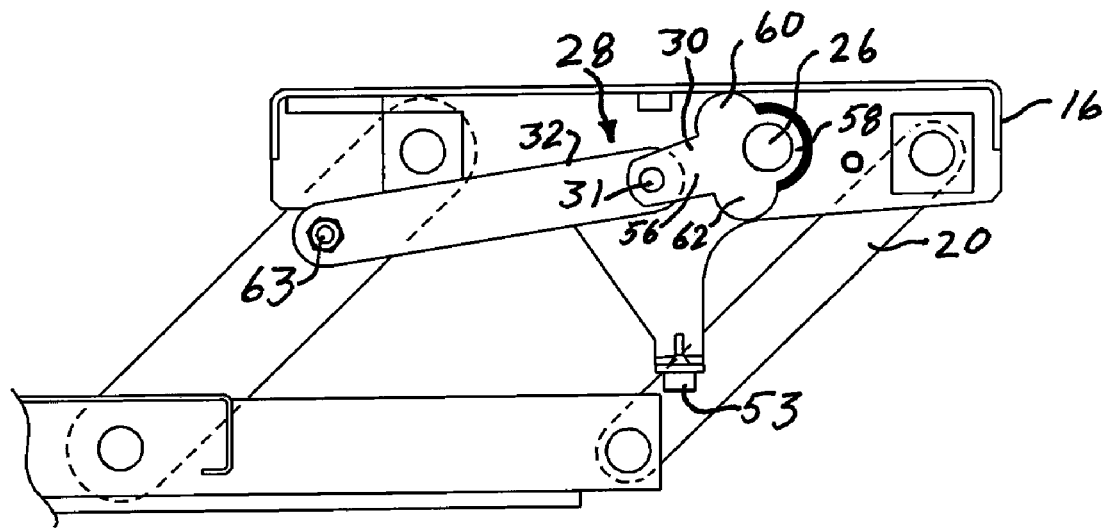
FIG. 8 is a detail cross-sectional view of the assembly along the line 8-8 of FIG. 5 in the extended position.
Figure 9:
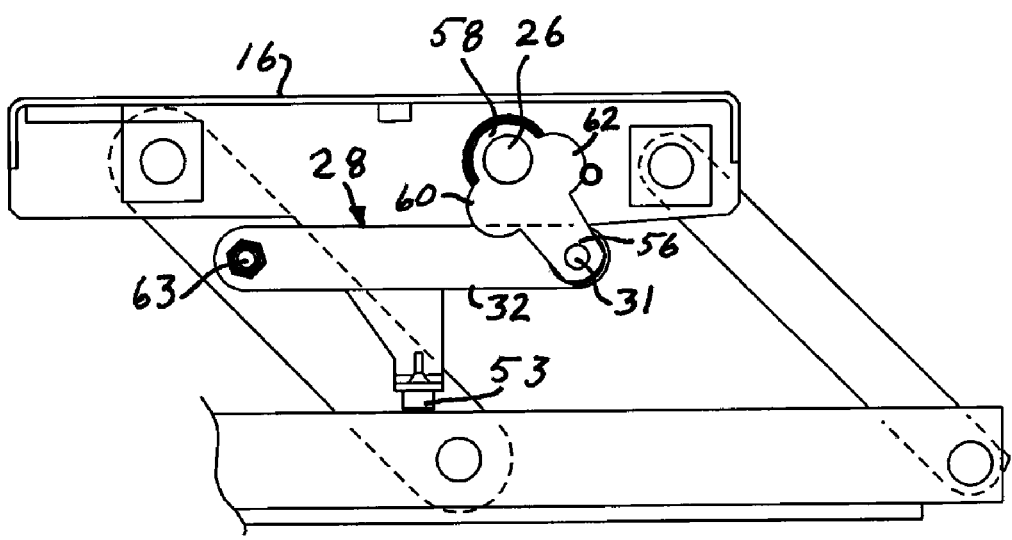
FIG. 9 is a view like FIG. 8 but in a retracted position.

Referring now to FIGS. 5-11, the assembly 10 also includes a pivot rod 26 extending transversely through the frame 16. The pivot rod 26 includes a two-part linkage 28 at opposing ends of the rod 26 perpendicularly fastened to the frame 16 (FIGS. 5-7). The two-part linkage 28 comprises a first, short, bulbous crank 30 pivotally attached to a second, longer, straight link 32 (FIGS. 8-9). The far end of link 32 is pivotally connected to link 22 at pivot 63. There is a linkage 28 at each end of rod 26 to drive the step in and out.

The crank 30 comprises a straight link fixed to rotate with rod 26 having two opposing ends 56, 58. A first end 56 is pivotally attached to the straight drive link 32 at pivot 31. A second end 58 is fixed to the pivot rod 26 and has two lobes 60, 62 on each side of the longitudinal axis of the crank 30. Lobe 62 is provided so that the crank 30 is symmetrical, i.e., it can be assembled and fixed to rod 26 with either side out.

In use, when the assembly 10 is in the extended position, the crank 30 is nearly straight with the link 32. That is to say that the centerline of the crank 30, which is the line from the center of pivot 26 to the center of pivot 31, is almost aligned with the centerline of link 32, which is the line from the center of pivot 63 to the center of pivot 31. It is almost aligned but still approaching the aligned position, and preferably not beyond the aligned position. The lobe 60 stopping against the bottom of the frame 16 prevents the crank 30 from going beyond the aligned position. If it were to go beyond the aligned position, then the step would undergo a change of direction (between extending and retracting) when the crank passed the aligned position, resulting in a "pop" impact on the step drive system that is caused by backlash in the system. This is undesirable and can result in premature failure of the system. The lobe 60 stopping against the bottom of the frame 16 stops the crank short of but preferably within less than 20 degrees of the aligned position.

The pivot rod 26 also includes a short finger assembly 36 rigidly mounted to the rod 26. The finger assembly 36 extends radially and perpendicularly away from the rod 26. A link arm 38 with a fixed length is connected to the finger assembly 36 with a universal joint 40. The universal joint 40 allows the finger assembly 36 and link arm 38 to pivot about generally vertical (about pivot 41) and horizontal (about the axis of the pin 35 that goes through the two arms 36) axes relative to the fingers 36.

The link arm 38 is swively-mounted to a horizontal drive gear 42 by a ball joint 39 at the end of crank arm 44 which is fixed to gear 42. The gear has teeth (not shown) which extend circumferentially along an arcuate edge portion of the gear 42. The gear 42 is centrally- and pivotally-mounted with a second pivot pin 48 to a motor mounting plate 50. The motor mounting plate 50 is in turn mounted to the frame 16. The gear teeth (not shown) engage a second drive gear within housing 52 which extends from a lower side of a motor 54.

Figure 10:
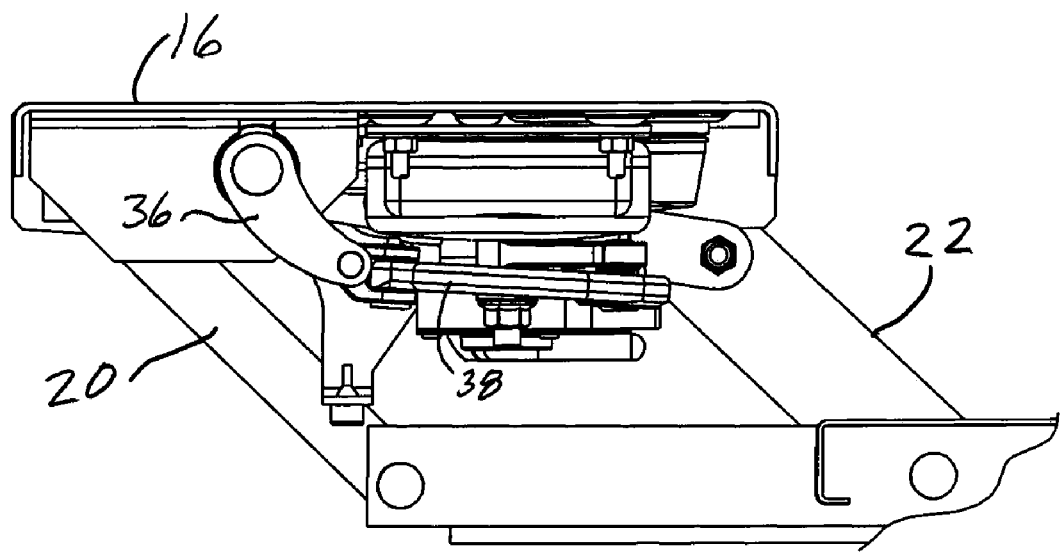
FIG. 10 is a side cross-sectional view of the assembly along the line 10-10 of FIG. 5 in the extended position.

The motor 54 is also mounted to the motor mounting plate 50. The finger assembly 36 extends forward and downward relative to the pivot rod 26, and the link arm 38 is horizontally rotated to a forward end of the gear 42 when the assembly 10 is in the extended position. While in the extended position, the link arm 38 is rotated toward the motor 54 relative to the rod 26 (FIG. 10).

Figure 11:
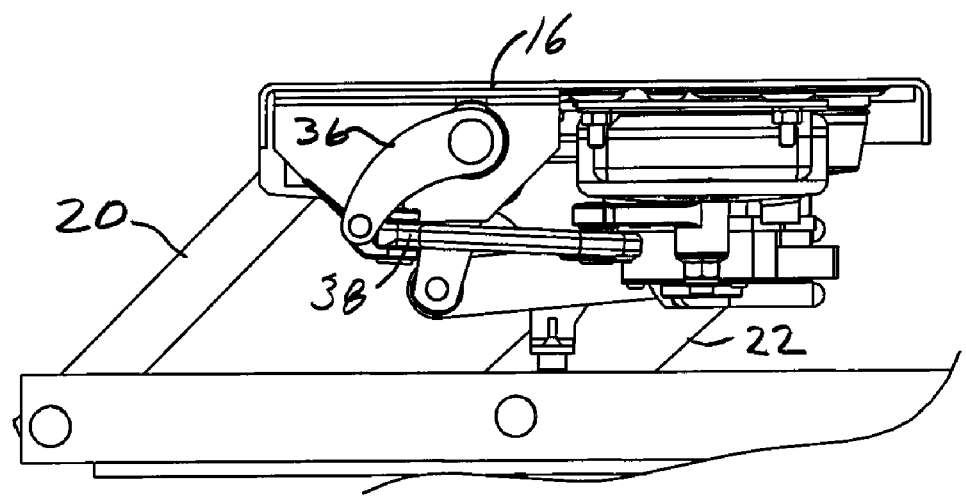
FIG. 11 is a side view like FIG. 10 but in the retracted position.

In the retracted position, the finger assembly 36 extends rearward and downward relative to the rod 26, and the link arm 38 is generally in a common plane with the finger assembly 36. The link arm 38 is also skewed longitudinally away from the motor 54 at an angle relative to the rod 26 (FIG. 11).

The motor 54 rotates the segment gear 42 approximately 90 degrees between the extended and retracted positions. The particular drive for driving the gear within housing 52 that meshes with segment gear 42 may be a worm gear drive, which tends to hold its position when stopped and so is preferred to resist any torque on rod 26 exerted by the step tending to backdrive the drive system, although any suitable drive could be used to rotate rod 26. In this regard, it is noted that, referring to FIG. 6, the pivots 39,41 and 48 are close to being aligned along a straight line so that any force exerted from the arms 36 of the rod 26 tending to backdrive the motor/drive unit would exert only a small torque about pivot 48, which could be easily resisted by the motor/drive unit.

In use, the frame 16 of the assembly 10 is mounted to the underside of a vehicle adjacent to the doorway (not shown). Prior to use, the assembly 10 is in the retracted position so that the upper and lower steps 12, 14 are recessed and retained beneath the frame 16. When the assembly 10 is actuated to move to the extended position, the motor 54 and associated drive train rotates the gear 42 clockwise approximately 90 degrees. As the gear 42 moves between these positions, the link arm 38 pulls the finger assembly or yoke 36 in a direction toward the gear 42 so that the rod 26 is rotated so as to extend the links 32. This rotation causes the upper and lower steps 12, 14 to move to the extended position.

When in the extended position, the two-part linkage 28, comprising the lobed crank 30 pivotally attached to the straight link 32, is in a nearly aligned and not-over-center position. The lobe 60 of the crank 30 forced and stopping against the bottom of the frame 16 results in this position of the crank 30 relative to the link 32. When pressure is placed on the upper and/or lower steps 12, 14 while in the extended position, the two-part linkage 28 may exert a torque on the rod 26, albeit a small torque since the crank is nearly aligned with the link 32 and therefore the moment-producing component of the force on the rod 26 would be small. Any torque exerted on the rod 26, tending to back drive it, is easily resisted by the drive train used to rotate rod 26.

Figure 3:
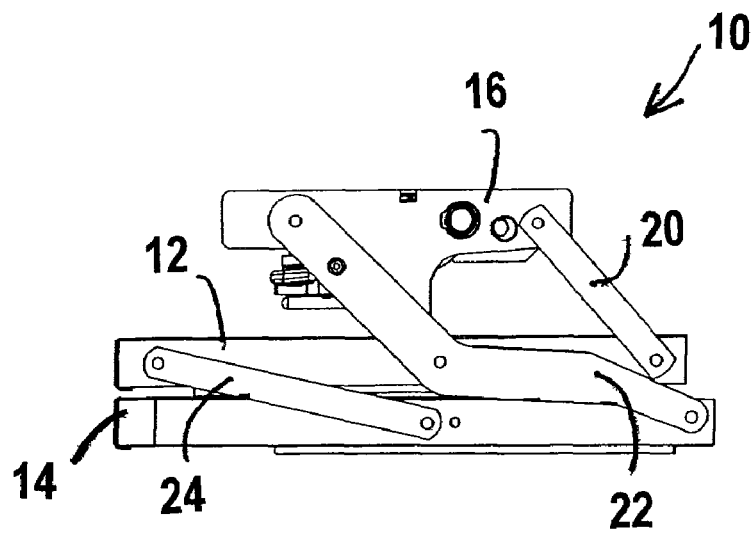
FIG. 3 is a side plan view of the assembly in the retracted position.
Figure 4:
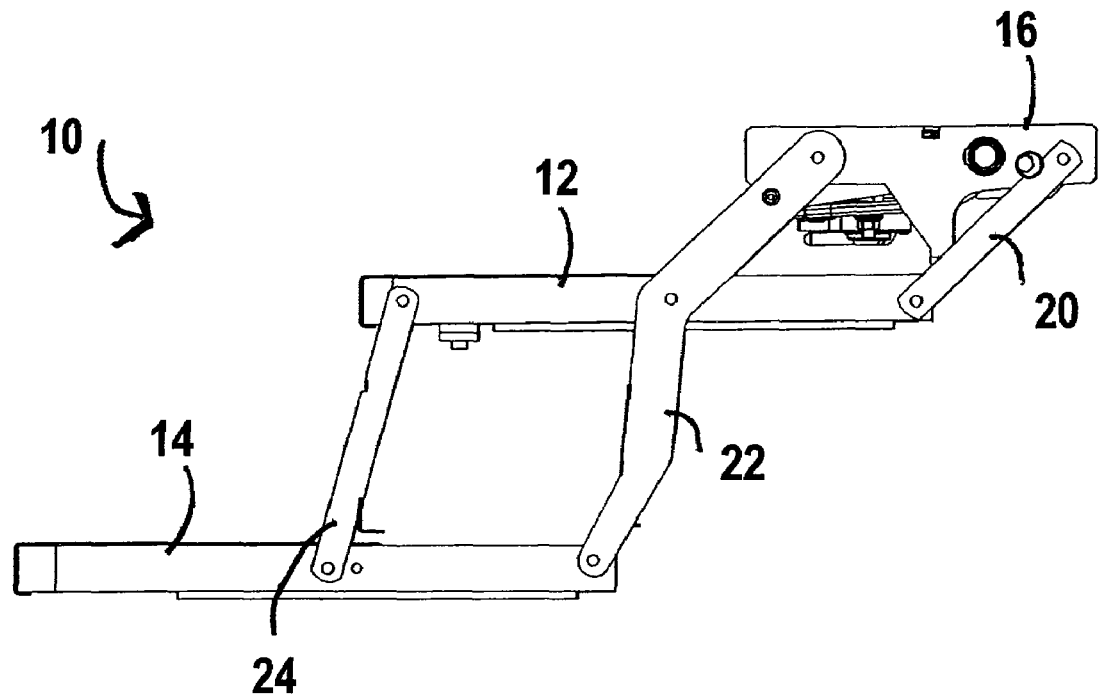
FIG. 4 is a side plan view of the assembly in the extended position.

When retracted, as illustrated in FIGS. 3, 6 and 9, the arm 44 is stopped against a stop 47 and in that stopped position the pivots 39,41 and 48 are substantially aligned along a straight line. With the pivots aligned, any force exerted from the step tending to backdrive the motor/drive unit will be very small and easily resisted by the drive unit. Also in the retracted position, the step is preferably pulled up against rubber bumpers 53, one on each side of the step. It is also noted that a second stop 49 may be provided to stop the arm 44 in the extended position, but the arm 44 would not normally stop against the stop 49 since it is stopped when lobe 60 contacts frame 16.

The assembly 10 may also include a light 70.

Of course, the description set out above is merely of exemplary preferred versions of the invention, and it is contemplated that numerous additions and modifications can be made. These examples should not be construed as describing the only possible versions of the invention, and the true scope of the invention will be defined by the claims.

We claim:

1. A movable step apparatus, comprising:
   a mounting frame;
   at least one step;
   a pivot assembly including a pivot rod mounted to the frame to pivot about an axis that is generally parallel to the step, and a first crank fixed to the rod; and
   a linkage assembly pivotally connecting the step and the frame;
   wherein the pivot assembly further includes a first drive link pivotally connected to both the first crank and the linkage assembly, whereby rotating the pivot rod back and forth about the axis moves the step between a retracted position and an extended position.

2. The apparatus of claim 1 wherein the linkage assembly comprises a plurality of links pivotally connecting the frame to the at least one step.

3. The apparatus of claim 1 wherein the pivot assembly comprises a two-part linkage mounted on each opposing end of the pivot rod, each two-part linkage also being pivotally connected to the linkage assembly, and one of said two part linkages including said first crank and said first link.

4. The apparatus of claim 3 wherein the two-part linkage at the end of the pivot rod opposite from said first crank comprises a second crank fixed to rotate with the pivot rod and a second link, wherein when at least one step is in the extended position, at least one of the cranks is pressed against the frame and stopped prior to reaching a position in which the crank is aligned with the drive link connected to the crank.

5. A movable step apparatus, comprising:
   a mounting frame;
   a motor mounted to the frame;
   at least one step;
   a pivot assembly mounted to the frame, the pivot assembly including a pivot rod having a longitudinal axis of rotation and having a two-part linkage comprising a first crank fixed to the pivot rod and pivotally attached to a first drive link;
   a linkage assembly pivotally connecting the frame to at least one step and the pivot assembly, whereby the linkage assembly moves the at least one step between a retracted position and an extended position when the pivot rod is rotated back and forth;
   a transmission assembly comprising a drive gear driven by a motor, the drive gear being rotatable about an axis of rotation, the transmission assembly being coupled between the motor and the pivot assembly such that rotating the motor in a first direction causes the pivot assembly to move the at least one step to the extended position, and rotating the motor in a second direction causes the pivot assembly to move the at least one step to the retracted position;
   wherein while the at least one step is in the extended position, a downward force applied to the at least one step acts through the two-part linkage to be reacted against by the transmission assembly.

6. The apparatus of claim 5 wherein the linkage assembly comprises:
   a first link pivotally connecting the frame to a first at least one step;
   a second link pivotally connecting the frame to a second at least one step; and
   a third link pivotally connecting the first and second steps.

7. A movable step apparatus, comprising:
   a mounting frame;
   at least one step;

a linkage assembly for movably coupling the step to the mounting frame between a refracted position and an extended position;

a pivot assembly including a pivot rod rotatably mounted to the frame and having a longitudinal axis of rotation, the pivot rod being connected to the linkage assembly such that rotating the pivot rod in one direction moves the step to the extended position, and rotating the pivot rod in an opposing direction moves the step to the retracted position; the pivot assembly further comprising a pair of two-part linkages each mounted on opposing ends of the pivot rod, each two-part linkage comprising a crank fixed to rotate with the pivot rod and pivotally mounted to a link that is pivotally connected to the linkage assembly to extend and retract the step;

a prime mover connected to the pivot rod so as to rotate the pivot rod in one direction by less than 360° to refract the step.

8. An apparatus as in claim 7, wherein a downward force on the step when extended is transferred through the two-part linkage to the prime mover to hold the step in the extended position.

9. An apparatus as in claim 8, wherein the crank touches the frame directly to stop in an extended position.

10. An apparatus as in claim 8, wherein a downward force on the step when retracted is transferred through the two-part linkage to the prime mover to hold the frame in the retracted position.

11. An apparatus as in claim 1, further comprising at least a second step, and wherein the linkage assembly includes a medial link pivotally connected to the mounting frame at a first end, the medial link being pivotally connected to the at least a second step at a second end, and the medial link being pivotally connected to the at least one step between the first and second ends.

12. An apparatus as in claim 11, wherein the first end of the medial link is spaced apart from the axis of the pivot rod.

13. An apparatus as in claim 1, wherein the linkage assembly includes:
   a rearward link pivotally connecting the mounting frame and the at least one step; and
   a medial link spaced apart from the rearward link and pivotally connecting the mounting frame and the at least one step.

14. An apparatus as in claim 13, wherein the rearward link includes two pivot points and the medial link includes two pivot points, and the pivot points of each of the rearward link and the medial link are spaced apart from the axis of the pivot rod.

15. An apparatus as in claim 1, wherein the linkage assembly defines a four-bar linkage structure together with the mounting frame and the at least one step, and the four-bar linkage structure includes four pivot points each spaced apart from the axis of the pivot rod.

* * * * *

UNITED STATES PATENT AND TRADEMARK OFFICE
CERTIFICATE OF CORRECTION

PATENT NO. : 7,677,584 B2
APPLICATION NO. : 11/869853
DATED : March 16, 2010
INVENTOR(S) : Richard W. Raley et al.

Page 1 of 1

It is certified that error appears in the above-identified patent and that said Letters Patent is hereby corrected as shown below:

Col. 7, line 2, Claim 7, change "refracted" to --retracted--.

Col. 7, line 17, Claim 7, change "refracted" to --retracted--.

Signed and Sealed this

First Day of June, 2010

David J. Kappos
*Director of the United States Patent and Trademark Office*